Patented Jan. 18, 1944

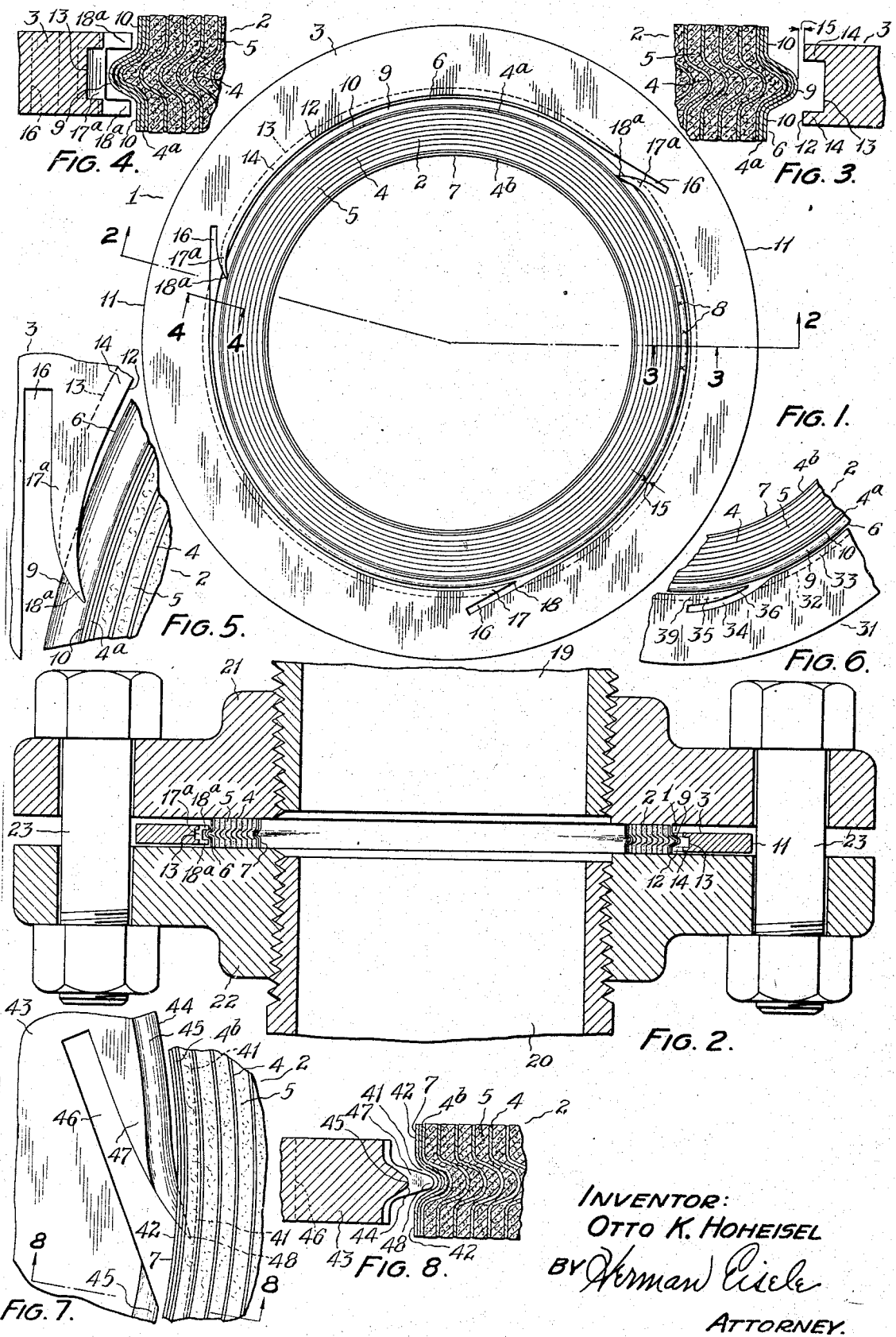

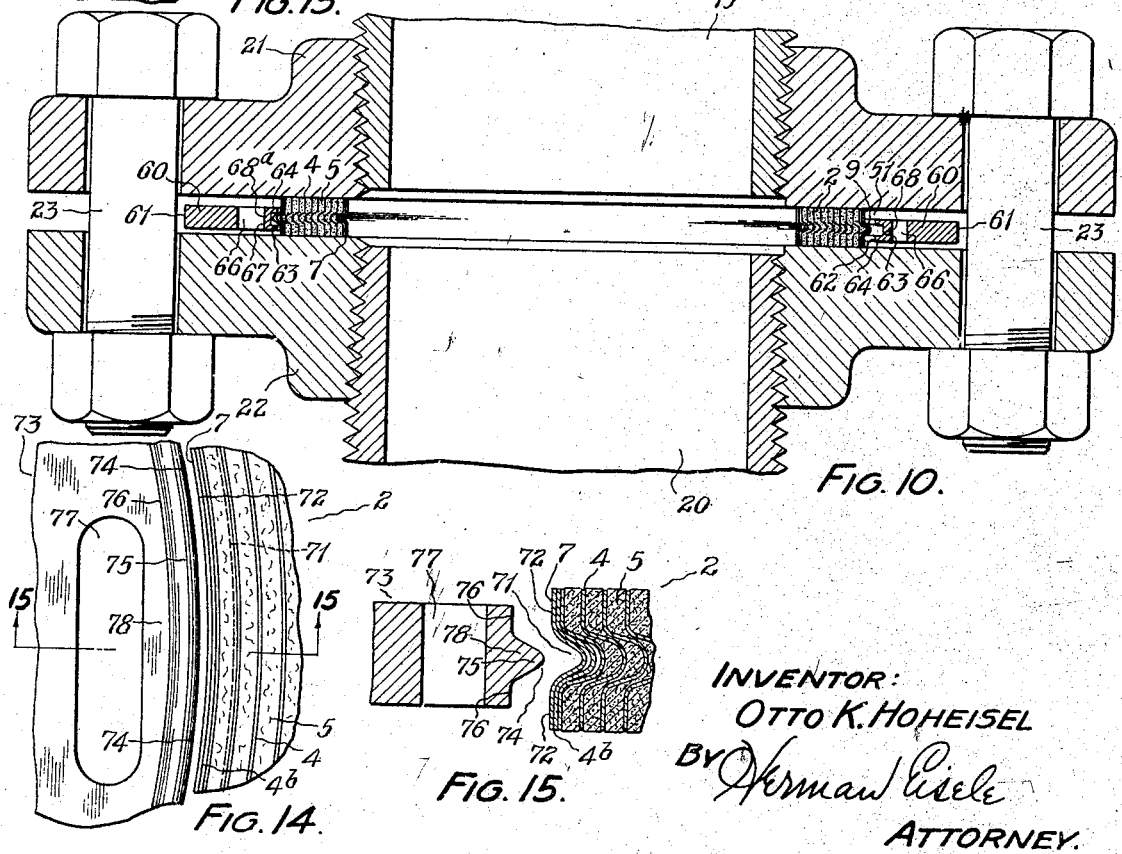

2,339,478

UNITED STATES PATENT OFFICE 2,339,478

COMPOSITE GASKET

Otto K. Hoheisel, Milltown, N. J., assignor to Frederick W. Goetze, New Brunswick, N. J.

Application December 28, 1942, Serial No. 470,329

9 Claims. (Cl. 288—27)

This invention relates generally to pressure sealing devices intended to be interposed between flanges of pipes or other plane surfaces in pressure piping or in pressure vessels, for the purpose of sealing the joint formed by these surfaces against leakage.

More specifically this invention relates to a composite gasket or gasket assembly comprising two component elements or parts, first: a pressure sealing element or gasket proper, also designated as a packing element, serving to cooperate with the opposed faces of the joint for sealing the pressure and second: a gauge element or compression limiting element for limiting the approach of the sealing surfaces toward each other and thus limiting the extent to which the sealing or packing element may be compressed by the faces of the joint.

Such combinations of compression limiting gauges with pressure sealing elements are well known and are most frequently provided when the sealing or gasket element is of a type which is likely to be damaged or likely to have its sealing effectiveness impaired if it is compressed beyond a predetermined limit.

One type of such sealing element or gasket with which compression limiting gauges have been combined is the type known as spiralwound gasket formed of spirally wound alternate metal and packing material strips, the metal strips being preformed with a peripheral bead which axially interlocks the strips or plies and which imparts axial resilience to the gasket. In a gasket of this type an over-compression not only destroys the resilience but otherwise distorts the gasket and impairs the sealing effectiveness of the gasket.

When such compression limiting gauges are combined with pressure sealing elements it is desirable to connect or lock the gauge element and the gasket element together in some manner so that the two elements may be handled as a unit in shipping, storing and installing. In gasket constructions of this type heretofore used, various types of means have been used for locking the sealing elements and the gauges together, some of which means have been permanent and others of which have been arranged to be manually assembled and disconnected.

This invention relates to the latter class of constructions.

Previous constructions of this latter class have frequently required that the gauge elements be formed of multiple parts. Such multiple part gauges are expensive and difficult to assemble.

In other cases where single piece or so-called solid gauge elements have been used, the interengaging peripheries of the sealing elements and of the gauge elements have required close sizing, and even then the means for locking the sealing elements and the gauges together have been uncertain and the sealing and gauge elements have frequently become accidentally and inadvertently disconnected and separated.

In a composite gasket of the type referred to, it is desirable for the sake of simplicity and economy, to use for the compression limiting gauge, a one piece element and for the sake of insurance against separation, to provide a means for locking the sealing element or gasket to the gauge which is positive. Inasmuch as different conditions make it advisable to combine different thicknesses of gauges with various thicknesses of gaskets it is further desirable to provide a locking means which can be readily and quickly manipulated to lock together or disconnect the gauge and gasket. It is also desirable for the purpose of preventing any interference by the gauge with the seating of and with the sealing function of the gasket, to make the interlocking means adjustable so as to provide for a variable amount of loose play between the gauge and the gasket.

It is accordingly a prime object of this invention to provide means for interlocking a pressure sealing gasket or packing element with a compression limiting gauge, which is positive and which will not permit the gasket and gauge to become inadvertently or accidentally separated in shipping, handling or installing in the piping.

It is a further object of this invention to provide means for interlocking the gasket with the gauge which can be easily and quickly effected manually by the use of ordinary simple hand tools, and in which the interlocking means can be readily manipulated to disconnect the gasket and the gauge, also by simple hand tools.

It is a further object of this invention to provide for interlocking a gasket and gauge, a pliable non-resilient interlocking means which comprises a bendable portion which can readily be bent by hand tools to effect the interlocking and which will permanently remain fixed in the bent interlocked position until manually returned to a non-interlocking position.

It is a further object of this invention to provide an interlocking means, for a gasket and gauge, in which any desired degree of loose play between the gasket and the gauge can be provided either at the time of original assembling or subsequently.

It is a further object of this invention to provide an interlocking means for a gasket and gauge which can be adjusted to positively position the gasket and gauge concentric with each other or eccentric with each other to any degree of eccentricity within the range of the adjustment.

It is a further object of this invention to provide an interlocking means which will not necessitate a close fit between the engaging peripheries of the gauge and gasket.

It is a further object of this invention to incorporate the interlocking means with the gauge in such a manner that a gasket of standard construction can be interlocked with the gauge without any alterations whatsoever in the gasket.

Further and more specific objects of this invention will become apparent from the following description and claims.

Referring to the drawings:

Fig. 1 is a plan view of one form of this improved composite gasket comprising a spirally wound packing or pressure sealing ring and compression limiting gauge in which the sealing ring and gauge are illustrated partly interlocked with each other by means of improved interlocks formed by slots in the gauge intersecting the periphery of the gauge.

Fig. 2 is an axial section of a pipe joint adapted to be sealed by a composite gasket of the type illustrated in Fig. 1, this gasket being interposed between flanges attached to adjacent ends of two alined pipes, the sectional view of the gasket in this figure being taken on the plane indicated by line 2, 2 in Fig. 1.

Fig. 3 is an enlarged transverse sectional view of a portion of Fig. 1 showing the conformations of adjacent peripheries of the sealing element and compression limiting gauge, this view being taken on the plane indicated by line 3, 3 in Fig. 1, at an area spaced from the interlocks.

Fig. 4 is an enlarged fragmentary transverse section of another portion of Fig. 1 this view illustrating the construction at one of the interlocks between the sealing element and compression limiting gauge, this view being taken on the plane indicated by line 4, 4 in Fig. 1.

Fig. 5 is a fragmentary enlarged view, drawn to the same scale as Figures 3 and 4, of a portion of Fig. 1 to more clearly illustrate the conformation of the interlock between the gauge and packing or sealing element.

Fig. 6 is a fragmentary view similar to a portion of Fig. 1 illustrating, however, a slightly modified conformation of interlock in the compression limiting gauge.

Fig. 7 is an enlarged fragmentary view similar to Fig. 5 showing this invention applied to an alternative arrangement of packing or sealing component and compression limiting gauge in which the gauge is disposed interiorly of the gasket.

Fig. 8 is a transverse sectional view of the arrangement shown in Fig. 7, this view being taken upon the plane indicated by line 8, 8 in said figure.

Fig. 9 is a plan view similar to Fig. 1 showing a modified form of interlock between pressure sealing ring and gauge, formed by slots disposed adjacent the periphery but within the confines of the compression limiting gauge.

Fig. 10 is a view similar to Fig. 2, illustrating an axial section of a pipe joint sealed by a composite gasket of the type illustrated in Fig. 9, the sectional view of the gasket in this figure being taken on the plane indicated by line 10, 10 in Fig. 9.

Fig. 11 is an enlarged transverse section of a portion of Fig. 9 showing the juxtaposed adjacent peripheries of the gasket and compression limiting gauge at one of the slots prior to manipulations for interlocking the gasket and the gauge, this view being taken on the plane indicated by line 11, 11 in Fig. 9.

Fig. 12 is an enlarged fragmentary transverse section of another portion of Fig. 9, this view illustrating the parts at one of the slots after the interlocking of the sealing ring or gasket and compression limiting gauge has been effected, this view being taken on the plane indicated by line 12, 12 in Fig. 9.

Fig. 13 is a fragmentary enlarged view drawn to the same scale as Figures 11 and 12 of a portion of Fig. 9 to more clearly illustrate the interlock between gasket and gauge.

Fig. 14 is an enlarged fragmentary view similar to Fig. 13 showing this invention applied to an alternate arrangement of gasket and compression limiting gauge in which the gauge is disposed interiorly of the gasket, this view showing the parts prior to their manipulation to effect the interlocking of the gasket and the gauge.

Fig. 15 is a transverse section of the arrangement shown in Fig. 14, this view being taken on the plane indicated by line 15, 15 in said figure.

In the following specification and claims the term "axial" when used with reference to portions of the composite gasket, is intended to indicate a direction parallel to or in the direction of a line passing thru the center of the gasket at right angles to the plane of the gasket which line may be termed the axial center line of the gasket. Likewise, the term "radial" is intended to indicate a direction transverse to this axial center line of the gasket, that is in a direction radial with respect to the center of the gasket. The terms "outwardly" or "inwardly" are intended to indicate directions respectively away from or toward the center of the gasket.

Referring first to the form of this invention illustrated in Figures 1 to 5, inclusive, the composite gasket, indicated in its entirety at 1, consists of two differently constituted components, first: a relatively compressible pressure sealing component or gasket proper indicated at 2, and second: a relatively rigid incompressible component or gauge element 3. Both of these components, in the embodiment illustrated, are substantially flat annular elements, the sealing component 2 being substantially concentric with and disposed within the incompressible or gauge component 3.

The sealing component 2 preferably consists of spirally wound alternate strips of metal and strips of packing material, the convolutions of metal being indicated at 4 and the convolutions of packing material being indicated at 5. The metal strip is formed intermediate its edges with a preferably centrally disposed corrugation forming an outwardly projecting peripheral bead positioned intermediate two substantially straight portions.

As will appear, both at the outer perimeter 6 and at the inner periphery 7 of the packing component 2, the metal strip continues beyond the packing strip and is wound upon itself for several turns as shown at 4a and 4b, respectively, the outer terminal convolutions being secured together by spot welding as indicated at 8 or otherwise.

The corrugation in the outer terminal convolutions of the strip metal forms a continuous outwardly projecting bead or tongue 9 running entirely around the perimeter 6 of the packing component between two substantially cylindrical wall portions or zones 10, 10. The width of the outwardly projecting bead is preferably about one-third of the total thickness of the gasket and the sides of the bead preferably converge outwardly.

The superimposed and rigidly secured terminal convolutions of metal strip are provided to stiffen and strengthen the inner and outer peripheries of the sealing component and to prevent the unwinding of this component in handling and service, and also to rigidly maintain the central bead conformation 9 on the outer periphery of the packing component.

In the intermediate area of the gasket or sealing component 2 formed by alternate strips of metal 4 and packing 5, the packing runs from face to face of the gasket and is effectively interlocked in the internested corrugations of the strip metal, as will clearly appear from Figures 3 and 4. In the completed gasket the width of the strip metal is preferably sligthly less but substantially equal to the width of the packing material. The corrugation or bead in the metal strip and the yielding nature of the packing material produces a resilience in the sealing component which causes it to return to or toward its original thickness after compression providing it has not been compressed beyond a predetermined permissible extent.

The rigid incompressible component or gauge 3 consists of a relatively flat preferably metallic member somewhat less in thickness, in an axial direction, than the sealing component 2. This gauge is formed, in the embodiment illustrated, with an outer periphery 11 which is substantially cylindrical and with an inner periphery 12 formed with a groove 13 disposed substantially in the median plane of the gauge and interposed between two narrow flanges or lands 14, 14. The width of the groove 13 in an axial direction is preferably wider than the greatest width of the bead 9.

It will appear that the tongue or bead 9 on the outer perimeter 6 of the packing component 2 and the groove 13 and flanges 14 on the inner periphery of the gauge component 3 constitute juxtaposed complementary tongue and groove conformations when these components are positioned, one within the other, in substantially the same plane.

It is also to be noted that the contour of the outer perimeter 6 defined by the tongue or bead 9 on the sealing component is substantially similar in outline to but preferably slightly smaller than the inner periphery 12 on the gauge as defined by the inner edges of the flanges or lands 14, leaving a relatively small clearance, indicated at 15 in Fig. 3, between the two opposed peripheries when the two components are concentric one with the other.

At a plurality of positions around the inner periphery 12 of the gauge 3, three in the embodiment disclosed in Figures 1 to 5, a slot or incision 16 is formed extending thru the body of the gauge element. This incision intersects the periphery 12 at an acute angle with reference to the adjacent portion of the periphery and thus forms a relatively slender tongue 17 coming to a point or tip, one side of this tongue being formed by the inner edge of the slot 16 and the other side of the tongue being formed by the periphery 12, this side of the tongue thus having the conformation of the groove 13 and flanges 14, 14. As will appear from the drawing the tip of the tongue consists of two axially spaced prongs 18, 18 which are continuations of the flanges 14, each of which runs to a point. The conformation of the tongue 17 as originally formed by the incision 16 and prior to certain subsequent manipulations is clearly shown at the lower portion of the view of the composite gasket 1 as illustrated in Fig. 1.

The material of which the relatively incompressible gauge 3 is made is preferably soft steel or other suitable metal which will permit the tongue 17 to be manually bent away from the body of the gauge 3 by means of a hand tool such as a screw driver, plier, chisel, or other like tool, into positions of the tongues and prongs which are shown at 17a and 18a in the upper portion of Fig. 1 and also in Figures 4 and 5, from which it clearly appears that the tongue and groove conformations are interengaged so as to be effectively axially interlocked.

In assembling the sealing component with the gauge component, the sealing component is inserted within the gauge component, preferably while all of the tongues on the gauge component are in the position indicated at 17, and the bead or ridge 9 is substantially alined with the groove 13. A screw driver or other convenient tool is then inserted successively into the incisions 16 and the prongs 18, and, if necessary, also a larger portion of the tongue 17 are bent substantially radially inward, at all of the incisions in succession, until the prongs straddle the bead 9 as clearly shown at 18a, 18a in Figures 1, 4, and 5, the tips 18a, 18a of the tongues extending almost to but preferably slightly short of the cylindrical wall portions 10, 10.

It will be understood that the tongues 17 are sufficiently pliable so as to permit bending into the positions indicated at 17a and 18a by means of hand tools. Altho the tongues 17 are pliable when manipulated with a hand tool they are not flexible or resilient, the nature of the metal of these tongues being such that the tongues remain fixed in the positions into which they are manually adjusted.

As will clearly appear from Figures 1, 4 and 5, the sealing component 2 and gauge component 3 are axially interlocked so that these parts cannot become accidentally or inadvertently separated in handling or installing.

A composite gasket such as that described and assembled above is ready for storage, shipping or for installation, and the rigid gauge component associated with the sealing component serves to protect the sealing component against distortion or other injury until safely seated in the joint.

While many services for composite gaskets of this type will occur to those skilled in this art, one application of the gasket is illustrated in Fig. 2, in which the gasket is used to seal a joint between the opposed flat faces of a pair of companion flanges. In this figure two alined pipe sections, assumed to be conveying fluid under pressure, are indicated at 19 and 20. Having threaded connection with the pipe sections 19 and 20 are companion flanges 21 and 22 each formed with a plurality of bolt holes adapted to receive bolts 23, serving as a means for forcing the flange faces toward each other.

Interposed between the faces of the flanges 21 and 22 is a composite gasket 1 such as that illustrated in Figures 1 to 5, in which the sealing component 2 is interlocked with the gauge component 3. Fig. 2 illustrates the packing component in its normal condition in engagement with the faces of the flanges 21 and 22 but prior to the application of any substantial pressure by the flange bolts 23.

In practice the flanges are drawn together into engagement with the faces of the sealing component of the interposed composite gasket by successively tightening the flange bolts 23 until a seal is effected or until the engagement of the compression limiting gauge by the flange faces is indicated by the solid resistance which prevents a further normal advancing of the flanges.

As a result of the above described action the clearance between the faces of the flanges 21 and 22 and the gauge 3 is reduced from that shown in Fig. 2 and is entirely eliminated in the event that the flanges have been advanced toward each other until they contact the gauge 3. This clearance, however, is so selected in the first instance, with respect to the thickness of the sealing component, that the compression of the sealing component to the thickness of the gauge will be ample to insure fluid tightness and so that the flanges, being limited by the gauge, cannot impose a degree of compression upon the sealing component which will be sufficient to over-compress or materially impair the sealing effectiveness of the gasket.

It is to be noted that the clearance 15 between the peripheries of the sealing and gauge components, in the composite gasket, is not critical and that the juxtaposed peripheries on the gauge and sealing component need not be accurately sized with respect to each other. It is only necessary that the sealing component be small enough to be readily insertable within the gauge component without unduly distorting the sealing component and that the outer perimeter of the sealing component be not so small as to be out of the range to which the tongues 17 and prongs 18 can be bent. The wide range of allowable clearance afforded by this invention is especially advantageous due to the difficulty of holding the outer perimeter of spirally wound packing components accurately to size in production.

It is also to be noted that the extent to which the tongue 17 and prongs 18 are bent toward the walls 10, 10 of the sealing component is under complete control of the mechanic who is assembling the components 2 and 3 and accordingly the sealing component may be tightly held by the prongs 18a against radial motion or, on the other hand, a wide range of radial loose play may be permitted between the components, while still maintaining an effective axial interlock between the components. In practice a slight radial loose play is desirable in order that the sealing element may assume its most effective sealing position without any interference or restraint by the gauge. Simultaneously with the radial loose play, axial loose play between the sealing and gauge components may be provided for by the excess in the width of the space between the prongs 18a, 18a and the axial width of the bead 9, as will be evident from an inspection of Fig. 4.

It is also to be noted that these improved bendable interlocking means make it possible to positively control the centering of the sealing component with reference to the gauge component, that is to make the components concentric with each other or eccentric with respect to each other to different extents as may be required by conditions, by bending opposed interlocking elements to varying extents.

As pointed out, the interlocked sealing component 2 and the gauge component 3 cannot inadvertently fall or be shaken apart and these parts can only be separated if and when the tongues 17a are again manually deflected outwardly until the inner side of the tongue and particularly the prongs 18a, 18a are again alined with or substantially alined with the original periphery of the gauge.

If it should become necessary to replace a gauge or sealing element of a composite gasket, either because a different combination is desirable to satisfy certain conditions or because the sealing element needs to be renewed, the tongues 17a and prongs 18a, 18a can readily be replaced into their original position be means of a pair of pliers one of whose jaws engages the inner surface of the tongue 17a or prongs 18a and the other of whose jaws engages the outer periphery 11 of the gauge.

In view of the circumstances that different conditions make advisable different degrees of compression, it becomes necessary to make provision to associate any one of several gauges with each compressible packing component and vice versa and the hereinbefore described quickly operable means make possible the rapid and positive connection with and rapid detachability of the one component from the other.

It is also to be noted that gauge components usually outlast several sealing components and can be re-used with new sealing components a number of times, for which re-use the above described gauge component is very effectively adapted.

This invention lends itself to various modifications one of which is illustrated in Fig. 6, this modification being directed primarily to a slightly different conformation of the incisions and tongue in the gauge component. In this figure, 2 indicates a fragmentary portion of the relatively compressible sealing component which is substantially identical with the sealing component in the previously described construction. The relatively incompressible or gauge component is fragmentarily indicated at 31 and is formed on its inner periphery with the median groove 32 between the flanges or lands 33. In this construction the incision extending thru the body of the gauge is indicated at 34 and is curved about a center within the confines of the gauge forming a slender tongue 35 terminating in tips or prongs 36, which tongue is thinner in a radial direction at its root 39 and hence is more readily bendable than the tongue 17 in the previously described construction.

Only one of these tongues is illustrated in Fig. 6 and it will be understood that any desired number may be provided in the gauge 31. It will be understood that this modified tongue 35 may manually be bent toward and from the sealing component 2 in the manner and with the tools previously described with reference to the tongue 17.

Figures 7 and 8 fragmentarily illustrate in an enlarged form an alternative arrangement of sealing element and compression limiting gauge in which the gauge is disposed concentrically with but interiorly of the sealing element. In these figures the relatively compressible sealing component is fragmentarily indicated at 2, this component being substantially identical with the sealing component previously described and consisting of spirally wound alternate strips 4 of metal and strips 5 of packing material, the metal strips being formed with a centrally disposed outwardly projecting corrugation or bead and the inner periphery 7 being formed of several overlapping convolutions of metal strip 4b which are secured together. Centrally disposed in the inner periphery 7 and resulting from the corrugation in the metal strip is an annular groove 41 disposed between two substantially cylindrical portions 42. A portion of the relatively incompressible gauge component is indicated at 43, this gauge component being concentric with and disposed interiorly of the sealing component. The outer periphery 44 of the gauge component is formed with an outwardly projecting tongue or bead 45, this bead being tapered and converging in an outwardly direction and preferably terminating in a slightly rounded rim, this rim being substantially identical with but preferably slightly smaller in transverse section than the conformation of the groove 41 in the packing component 2.

Intersecting the outer periphery and extending thru a peripheral portion of the body of the gauge 43 are a plurality of slots or incisions 46 disposed at an acute angle with the adjacent portion of the periphery, only one of these slots being shown in Fig. 7.

The slot 46 forms, with the periphery 44 of the gauge, a relatively narrow tongue 47 having a tip 48 formed of a portion of the bead 45. This tongue, being formed of relatively soft but relative inelastic metal, can readily be bent outwardly away from the body of the gauge until the tongue enters the groove 41 at the inner periphery of the sealing element as clearly illustrated in Figures 7 and 8. An inspection of these figures clearly illustrates the axial interlocking between the gauge and packing component which results when the tongue 47 is in the position shown.

A composite gasket constructed in accordance with Figures 7 and 8 is particularly advantageous for use in sealing joints against pressures acting radially inward such as occur in vacuum chambers, condensers, etc.

Figures 9 to 13, inclusive, illustrate another form of this invention, in which a modified form of the previously described bendable interlocking means is disclosed. This modified bendable interlocking means comprises an endless bridge of metal instead of the tongue disclosed in the previously described forms of this invention.

A complete embodiment of this modified composite gasket 51 is disclosed in Figures 9 and 10. This composite gasket assembly 51 consists of relatively compressible sealing component 2 and a relatively rigid incompressible component or gauge 60. The sealing component 2 is substantially identical with the sealing components disclosed in the previously described modifications consisting of spirally wound alternate strips 4 of metal and strips 5 of packing material and being formed at its outer periphery 6 by a plurality of superimposed convolutions of metal strip 4a with a preferably centrally disposed outwardly projecting bead or tongue 9 running entirely around the perimeter of the sealing component interposed between cylindrical peripheral zones 10, 10.

The gauge component 60 consists of a relatively flat metallic member less in thickness than the sealing component 2 and is formed with a substantially cylindrical outer periphery 61 and with an inner periphery 62 formed with a groove 63 disposed in the median plane of the gauge and interposed between two intermediate flanges or lands 64, 64. The width of the groove 63 is preferably wider in an axial direction than the greatest width of the bead 9, which bead preferably converges in an outwardly direction.

As in the constructions disclosed in Figures 1 to 5, when the sealing component is disposed within the gauge component, the bead 9 and the groove 63 constitute juxtaposed complementary tongue and groove conformations. The outer periphery defined by the bead or tongue 9 on the sealing component is substantially equal to but slightly smaller than the inner periphery 62 of the gauge as defined by the inner edges of the flanges or lands 64, leaving a preferably small clearance 65 (Fig. 11) between the two opposed peripheries when the components are concentric one with the other. At a plurality of positions around the inner periphery 62 of the gauge 60, three in the embodiment disclosed in Fig. 9, an elongated slot or incision 66 is formed extending thru the body of the gauge element. This incision is slightly spaced from the periphery 62 and is substantially parallel to the adjacent portion of this periphery as a result of which spacing a relatively narrow continuous bridge 67 of metal is formed between the slot 66 and the periphery 62, one side of the bridge being formed by the inner edge of the slot 66 and the other side of the bridge being formed by the periphery 62, this latter side including a portion of the groove 63 and flanges 64, 64. The conformation of this bridge as originally formed by the incision 66 and prior to certain subsequent manipulations is clearly shown at the lower portion of the view of the composite gasket, as illustrated in Fig. 9, in which the central portion 68 of the bridge 67 is substantially straight.

As in the previous disclosures the material of which the gauge 60 is made is preferably soft steel or other suitable metal which will permit the relatively narrow bridge 67 to be stretched and bent away from and toward the body of the gauge by means of a hand tool such as a screw driver, plier, etc., without necessarily causing a fracture in the bridge. Bent positions of these bridges are clearly indicated at 68a, 68a in the upper portion of Fig. 9 and in Fig. 13.

In assembling the sealing component with the gauge component, the sealing component is inserted within the gauge component, preferably while all of the bridge portions 67 are substantially straight or parallel to the inner periphery 62 of the gauge. A screw driver or other convenient pointed tool is then inserted into one of the incisions 66 and the central portion 68 of the bridge is bent substantially radially inwardly until the innermost edges of the flanges 64, 64 are positioned adjacent the cylindrical zones 10, 10 of the sealing component and on opposite sides of the bead 9.

As will be understood, these bridge portions are relatively inelastic and the nature of the metal of these bridges is such that they remain fixed in the positions into which they are adjusted.

As will clearly appear from Figures 9, 12 and 13, the sealing component 2 and the gauge component 60 are axially interlocked so that these parts cannot accidentally become separated or shaken loose in handling or installing.

This modified type of composite gasket just described is used for the same service and in the same manner as the composite gasket illustrated in Figures 1 to 5, and such use of the composite gasket is illustrated in Fig. 10 in which the composite gasket is associated with companion flanges 21 and 22 having threaded connection with pipe sections 19 and 20 respectively adapted to receive bolts 23 serving as a means for forcing the flange faces toward each other and into progressively tighter sealing engagement with the packing ring 2 and eventually into abutting engagement with the gauge ring 60.

Fig. 10 illustrates the sealing component in its normal uncompressed condition in engagement with the faces of the flanges and prior to the application of any substantial pressure by the flange bolts. In this form of this invention also, the differential between the thicknesses of the sealing component and the gauge component is so selected that an excessive or damaging degree of compression cannot be imposed upon the sealing element by the flanges.

In this instance also, the radical clearance 65 between the peripheries of the sealing and gauge components is not critical, it being necessary only that the minimum clearance between the peripheries of the components be sufficient to permit the sealing component to be readily inserted within the gauge component and that the maximum clearance be small enough so that it will not exceed the range to which the center 68 of the bridge 67 can be stretched or bent.

In this construction also, the extent to which the bridge 67 is bent toward the outer periphery of the packing component is under the complete control of the user who is assembling these units and the desired range of radial and axial loose play between the components is readily obtainable.

In this construction likewise, the packing component can only be separated from the gauge component by bending the bridge portions 68a outwardly, that is, away from the sealing component, until they are again alined or substantially alined with the original periphery of the gauge, which outward bending can readily be effected by the use of pliers or other similar hand tools as described with reference to the construction disclosed in Figures 1 to 5.

The bridge type of interlocking means just described is also well adapted for use in a composite gasket in which the compression limiting component is disposed interiorly of the packing component and such a construction is fragmentarily illustrated in enlarged form in Figures 14 and 15.

In these figures, 2 indicates the packing component substantially identical with the packing components previously described and formed at its inner periphery 7 with a groove 71 interposed between cylindrical zones 72, 72 the groove 71 resulting from the beaded conformation of the metal strip 4. The relatively incompressible or gauge component is indicated at 73 having an outer periphery 74, this outer periphery being formed with a median outwardly converging tongue or bead 75 interposed between cylindrical surfaces 76, 76. This bead is formed with a slightly rounded outer edge of substantially the same curvature as the bottom of the groove 71 and the radial extension of the bead beyond the cylindrical surfaces 76, 76 is preferably substantially equal to the depth of the groove 71 measured from the faces of the cylindrical zones 72, 72. Adjacent the outer periphery 74 of the gauge 78 an elongated slot or incision 77 is formed, this slot extending thru the body of metal of the gauge and being spaced from the periphery 74 and substantially parallel to the adjacent portion of this periphery. This slot forms a relatively narrow bridge of metal 78 between the incision 77 and the periphery 74, the radial width of this bridge being of such thickness as to permit it to be bent radially from alinement with the periphery 74 into engagement with the adjacent perimeter of the sealing component so as to produce an axial interlock between the outwardly bent bead 75 on the bridge 78 and the groove 71 on the sealing component. The distortion or bending of the bridge 78 is effected by the use of simple hand tools all as described with reference to the disclosure of Figures 9 to 13, inclusive.

While in the hereinbefore described construction the compression limiting gauges are each shown as a one piece element, it is pointed out that these gauges need not necessarily be formed of one piece but may be made of two or more pieces, to suit the convenience of the manufacturer.

It is also noted that the packing element and the gauge are each shown annular in conformation. These pieces need not necessarily be round, and are regularly made in oval, elliptical, or other irregular shapes and may assume any conformation which may be necessary or convenient to suit the conformation of the areas to be sealed.

It is also to be noted that the outer periphery of the gauge may be provided with bolt holes to receive flange bolts or with notches to receive portions of bolts.

It will also be understood that, altho the construction illustrated discloses three bendable tongues or bridges, this invention is not necessarily limited to three such interlocking elements, but any number of interlocking elements may be provided, a larger number than three being especially advantageous for the larger sizes of gaskets and for non-circular gaskets.

Many other modifications of this invention and its application in addition to those shown, will naturally occur to those skilled in this art and the present disclosures should therefor be considered as typical only and applicant desires not to be limited to the exact constructions shown and described.

What I claim is:

1. A composite gasket comprising in combination a compressible sealing component and a relatively incompressible compression limiting component, said components being disposed one within the other and the inner component being formed with an outer periphery slightly smaller in size than the inner periphery of the outer component, said peripheries having complementary juxtaposed tongue and groove conformations, one of said peripheries being formed with a pliable relatively inelastic radially bendable portion including a portion of one of the elements of said tongue and groove conformations adapted to be bent into permanent interlocking engagement with the other element of said tongue and groove conformations on the other of said peripheries.

2. A composite gasket comprising in combination a compressible pressure sealing component and a relatively incompressible compression limiting component, said components being disposed one within the other, the inner component being formed with an outer periphery slightly smaller in size than the inner periphery of the outer component, said peripheries having juxtaposed complementary tongue and groove conformations, the said periphery of the compression limiting component being formed with a pliable relatively inelastic radially bendable portion integral with the compression limiting component and including a portion of one element of said tongue and groove conformations and being adapted to be bent into permanent interlocking engagement with the sealing component, whereby said components become axially interlocked.

3. A composite gasket comprising in combination a compressible sealing component and a relatively incompressible compression limiting component, the sealing component being disposed interiorly of the compression limiting component and being formed with an outer periphery slightly smaller in size than the inner periphery of the compression limiting component, said peripheries having complementary juxtaposed tongue and groove conformations, one of said peripheries being formed with a pliable relatively inelastic radially bendable portion including a portion of one of the elements of said tongue and groove conformations adapted to be bent into permanent interlocking engagement with the other element of said tongue and groove conformation.

4. A composite gasket comprising in combination a compressible sealing component and a compression limiting component, said components being disposed one within the other and said compression limiting component being formed with a periphery having a contour substantially similar in outline to the adjacent perimeter of the sealing component, the said periphery and perimeter being formed with complementary tongue and groove conformations, and said compression limiting component being formed with an incision extending thru the body of the component adjacent the periphery forming a bendable portion of metal including a section of the periphery and being adapted to be bent radially from the original line of the periphery into engagement with the adjacent perimeter of the gasket.

5. A composite gasket comprising in combination a compressible sealing component and a compression limiting component, said components being disposed one within the other and said compression limiting component being formed with a periphery having a contour substantially similar in outline to the adjacent perimeter of the sealing component, the perimeter of the sealing component being formed with a tongue in a median plane projecting toward the compression limiting component and the periphery of the compression limiting component being formed with a groove juxtaposed to the tongue, and said compression limiting component being formed with an incision extending thru the body of the component adjacent the periphery forming a bendable portion of metal including a section of the groove and being adapted to be bent radially from the original line of the periphery into axially interlocking engagement with the tongue on the perimeter of the gasket.

6. A composite gasket comprising in combination a compressible sealing component and a compression limiting component, said components being disposed one within the other and said compression limiting component being formed with a periphery having a contour substantially similar in outline to the adjacent perimeter of the sealing component, the said periphery and perimeter being formed with complementary tongue and groove conformations, and said compression limiting component being formed with a slot extending thru the body of the component intersecting the periphery at an acute angle, forming a pliable tongue including a section of the periphery adapted to be bent radially from the original line of the periphery into engagement with the adjacent perimeter of the gasket.

7. A composite gasket comprising in combination a flat compressible sealing component and a flat compression limiting component, said components being disposed one within the other and said compression limiting component being formed with a periphery having a contour substantially similar in outline to the adjacent perimeter of the sealing component, the said periphery and perimeter being formed with complementary tongue and groove conformations, and said compression limiting component being formed with a slot spaced from the periphery and substantially parallel to the adjacent portion of the periphery, forming a bridge of metal between the slot and the periphery adapted to be bent radially from the original line of the periphery into engagement with the adjacent perimeter of the gasket.

8. An article of manufacture comprising a substantially flat annular element adapted to protect a gasket interposed between sealing faces against excessive compression by the faces, said element being formed at one of its peripheries with a groove interposed between lands and a slot extending thru the body of the element intersecting the groove and periphery at an acute angle with the adjacent portion of the periphery, forming a pliable tongue including a portion of said groove and lands adapted to be bent away from the body of the element.

9. An article of manufacture comprising a substantially flat metallic element adapted to protect a gasket interposed between sealing faces against excessive compression by the faces, said element being formed at one of its peripheries with a groove interposed between lands and a slot extending thru the body of the element, said slot being spaced from the periphery and substantially parallel to the adjacent portion of the periphery, forming a bridge of metal between the slot and the periphery adapted to be bent radially from the line of the periphery.

OTTO K. HOHEISEL.